(12) United States Patent
Appel (10) Patent No.: US 6,654,169 B2
(45) Date of Patent: Nov. 25, 2003

(54) OPTICAL DEVICE

(75) Inventor: Roland Kevin Appel, Hampshire (GB)

(73) Assignee: Qinetiq Limited, Farnborough (GB)

( * ) Notice: Subject to any disclaimer, the term of this patent is extended or adjusted under 35 U.S.C. 154(b) by 0 days.

(21) Appl. No.: 10/131,497

(22) Filed: Apr. 25, 2002

(65) Prior Publication Data

US 2002/0181101 A1 Dec. 5, 2002

(30) Foreign Application Priority Data

Apr. 28, 2001 (GB) .............................................. 0110492

(51) Int. Cl.⁷ .............................................. G02B 27/28
(52) U.S. Cl. ........................ 359/487; 359/485; 359/833
(58) Field of Search ................. 359/483, 485, 359/487, 833

(56) References Cited

U.S. PATENT DOCUMENTS

| 4,511,220 A |   | 4/1985 | Scully |           |
|-------------|---|--------|--------|-----------|
| 4,822,150 A |   | 4/1989 | Duarte |           |
| 4,917,461 A | * | 4/1990 | Goldstein | ............... 359/352 |
| 4,948,228 A | * | 8/1990 | Keens  | ............... 359/485 |
| 5,124,634 A | * | 6/1992 | Ulmer et al. | ........... 324/96 |
| 5,684,630 A | * | 11/1997 | Arai  | ............... 359/487 |
| 5,751,482 A |   | 5/1998 | Challener, IV | ......... 359/487 |

FOREIGN PATENT DOCUMENTS

| EP | 0 631 156 | 12/1994 |
| SU | 1657935   | 6/1991  |

* cited by examiner

*Primary Examiner*—John Juba
(74) *Attorney, Agent, or Firm*—Nixon & Vanderhye P.C.

(57) ABSTRACT

An optical device (29) for rotating the polarization of a linearly polarized, broadband input beam of light (3) comprises prism means (30, 37, 43). The input beam is incident normal to a first face (31) and exits normal to a second face (47) of the prism means. The prism means comprises a light transmitting material having a plurality of totally internally reflecting surfaces (32,33,34) and one or more interfaces, the totally internally reflecting surfaces are arranged such that the polarization of the exit beam is rotated by 90° relative to the input beam, each interface comprises a pair of parallel surfaces (35, 39) separated by a gap (36), the parallel surfaces are arranged substantially to satisfy the Brewster condition such that surface reflection losses are minimized and the input and exit beams are substantially collinear.

11 Claims, 6 Drawing Sheets

OPTICAL DEVICE

BACKGROUND OF THE INVENTION

1) Field of the Invention

This invention relates to an optical device for rotating the polarisation of linearly polarised light by 90°. More specifically it relates to such a device where the beam input to the device and the beam exiting the device are collinear.

2) Discussion of the Prior Art

There are many applications where it is desirable to rotate the plane of polarisation of polarised light through 90°. These include spectroscopy, where polarisation holds key information such as polarisability, white light interferometry where the reference beam may be required to be rotated by 90° in order to see cross polarised components and quantitative metrology applications where measurements are to be made at 0° and 90°.

This has traditionally been achieved by using a half wave plate or by the use of Fresnel rhombs, however there are difficulties associated with these.

A waveplate exploits the birefringence of certain optical materials to impose the required phase shift between the orthogonally polarised components of the light. Individual half wave plates are only effective over a narrow wavelength range, therefore a large number of plates would be required to cover a wide wavelength range. These waveplates must be used individually so that it is not possible to simultaneously cover a wide wavelength range.

Super achromatic waveplates comprise several pairs of matched waveplates made of more than one optical material, so designed that there is chromatic correction over a larger wavelength range. However, achromatic waveplates have a number of drawbacks. The constituent optical elements may be contacted with optical cement, limiting optical power throughput and chromatic correction is still limited for operation at wavelengths below ~300 nm.

Fresnel rhombs achieve wavelength retardation by exploiting the phase difference imposed on s and p polarised light upon total internal reflection. This phase shift is relatively slow varying with wavelength compared to the performance of a waveplate. Nevertheless, the performance is not achromatic, for example a pair of silica Fresnel rhombs designed for half wave operation impose a phase retardation of 180±8° over the wavelength range 200–400 nm. The deviation from exactly 180° of phase retardation results in the light becoming elliptically polarised.

U.S. Pat. No. 4,822,150 describes a device for rotating the polarisation of a light beam by 90° while maintaining collinearity comprising a plurality of right angled prisms. The prisms are cemented together such that all interfaces are perpendicular to the path of the light beam. As such, large internal reflection losses at the interfaces will occur. These losses can be reduced by coating the adjoining surfaces of the prisms with an anti-reflection coating, however this leads to an increase in complexity and cost and it is also difficult to design a coating which will operate effectively over a large wavelength range. Furthermore, it is also not possible to provide a broadband, anti-reflection coating which operates in the UV range below ~260 nm. It is possible to reduce reflections using an index matching liquid or cement, but these tend to cause operational difficulties below 260 nm and are not suitable for high power optical throughput. It is suggested that the device can be formed from a single piece of glass, in which case no coating would be required, however the complexity of the device would make this method of manufacture very difficult and costly. This is due to the difficulty in polishing an inner surface on an overhanging structure.

U.S. Pat. No. 5,751,482 describes a prismatic device for rotating the polarisation of a light beam. As with U.S. Pat. No. 4,822,150 the interfaces between the prisms are perpendicular to the path of the light beam so the limitations caused by internal reflections and the problems associated with suitable coatings also apply.

BRIEF SUMMARY OF THE INVENTION

In accordance with the present invention an optical device for rotating the polarisation of a linearly polarised, broadband input beam of light comprises prism means; wherein the input beam is incident normal to a first face and exits normal to a second face of the prism means; wherein the prism means comprises a light transmitting material having a plurality of totally internally reflecting surfaces and one or more interfaces; wherein the totally internally reflecting surfaces are arranged such that the polarisation of the exit beam is rotated by 90° relative to the input beam, wherein each interface comprises a pair of parallel surfaces separated by a gap; wherein the parallel surfaces are arranged substantially to satisfy the Brewster condition such that surface reflection losses are minimised; and wherein the input and exit beams are substantially collinear.

The arrangement of the parallel surfaces so as to satisfy the Brewster condition is derived as follows;

Refraction of a light beam passing from a medium with refractive index, $n_i$, through an interface with a medium with refractive index, $n_t$, is governed by Snell's Law;

$$n_i \sin \theta_i = n_t \sin \theta_t \qquad (1)$$

where $\theta_i$ and $\theta_t$ are respectively, the angle of incidence of the input beam and the angle of the refracted beam.

The reflection of the incident beam, for example for p-polarised light, is described by the Fresnel reflection coefficient;

$$R_\| = \frac{\tan^2(\theta_i - \theta_t)}{\tan^2(\theta_i + \theta_t)} \qquad (2)$$

from equation (2), the reflection coefficient is equal to zero when $\theta_i + \theta_t = 90°$. Substitution into equation (1) gives the Brewster condition;

$$\tan \theta_i = n_t/n_i \qquad (3)$$

At this value of $\theta_i$, there is no reflection of p-polarised light at the interface.

Arranging the parallel surfaces so as to substantially satisfy the Brewster condition and ensuring that all the internally reflecting surfaces are totally reflecting means that the only significant reflection losses in the device of the present invention are those at the first incident face and the second exit face of the prism means. This leads to a significant reduction in the total losses when compared with prior art devices. The device of the present invention can be manufactured using conventional grinding and polishing techniques. Furthermore, it does not require the use of anti-reflection coatings, enabling operation in the UV range below 260 nm.

The transition of the light beam across an interface introduces a lateral shift into the beam path which is dependent on the wavelength of the light.

Preferably, the interfaces are arranged such that lateral shifting of the beam is mutually cancelled. This ensures that the input beam and output beam are collinear.

Preferably, the prism means comprises three prism sections and two interfaces. This arrangement allows for easy manufacture of the device, however it is clear that alternative arrangements may be constructed. These may include arrangements with odd numbers of interfaces if precise collinearity is not required.

Conveniently, the light transmitting material comprises fused silica. This allows for the construction of a device capable of operation from 200–2000 nm.

Preferably, gap separating the parallel surfaces is air filled.

Preferably, the input beam of light has a wavelength in the range of 200–700 nm.

Preferably, the input beam of light is collimated.

Preferably, the input beam of light is linearly polarised such that the light refracted at internal surfaces is p-polarised.

The Brewster angle is wavelength dependent so zero reflection at a given angle will only be satisfied for a particular wavelength. To allow broadband operation a compromise angle must be chosen for the interfaces which gives minimal reflection over the required spectral range.

Using light transmitting material comprising fused silica, operation between 200–700 nm and an air filled gap preferably, the parallel surfaces are set so that the angle between the direction of propagation of the light beam in the light transmitting material and a normal to the parallel surfaces is in the range 32° to 35°, more preferably the parallel surfaces are set so that the angle is in the range 33.260 to 33.76° and ideally the parallel surfaces are set so that the angle is 33.51°.

For a light transmitting material other than fused silica, such as magnesium fluoride or a different medium filling the gap between the parallel surfaces, such as a liquid, a different angular range would be specified in order to minimise reflection losses.

BRIEF DESCRIPTION OF THE DRAWINGS

The invention will now be described by way of example only with reference to the following drawings in which.

DISCUSSION OF THE EMBODIMENTS

Figure 1:
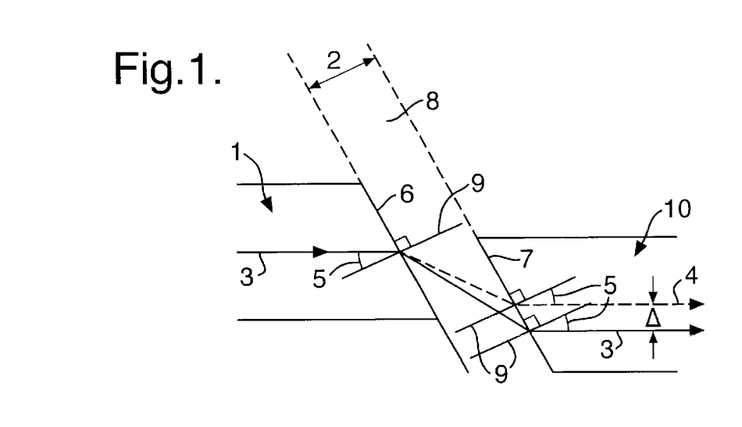
FIG. 1 shows a representation of the lateral shift experienced by a light beam crossing an interface between two parallel surfaces set so as to satisfy the Brewster condition.

Two prism sections 1, 10 and an interface 2 are shown in FIG. 1. A broadband p-polarised light beam 3 exits prism section 1 from surface 6 and crosses interface 2. The interface 2 comprises two parallel surfaces 6, 7 and a gap 8. The parallel surfaces are arranged such that an angle 5 is formed between the propagation direction of the light beam in the prism sections and a normal 9 to the parallel surfaces so that the Brewster condition is satisfied. With the Brewster condition satisfied there is substantially no reflection of the beam 3 from parallel surfaces 6 and 7. Since the Brewster angle is dependent on wavelength, a lateral shift is observed when the incident beam is broadband. This is shown in FIG. 1 as light beam 4. The magnitude of this shift, Δ, is also dependent on the width of the interface 2. For example, Δ=1 mm for light with wavelength in the range 200–700 nm, optical elements of fused silica and an air filled gap with a width of 10 mm.

Figure 2:
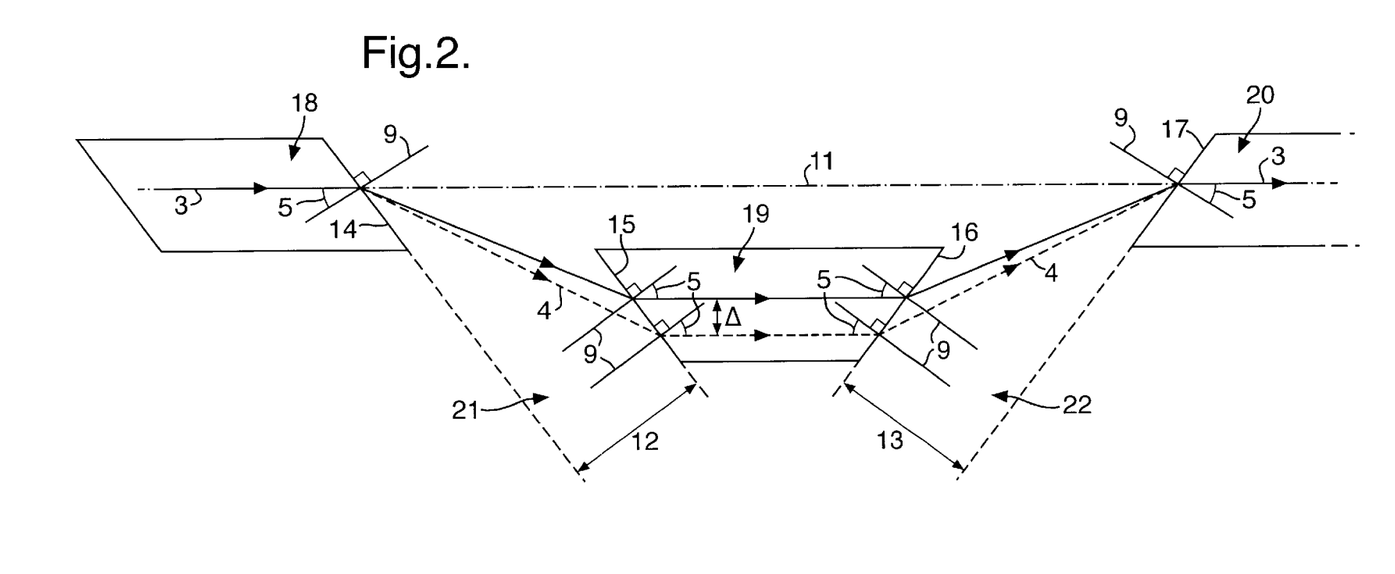
FIG. 2 shows a representation of two interfaces comprising parallel surfaces set so as to satisfy the Brewster condition.
Figure 3A:
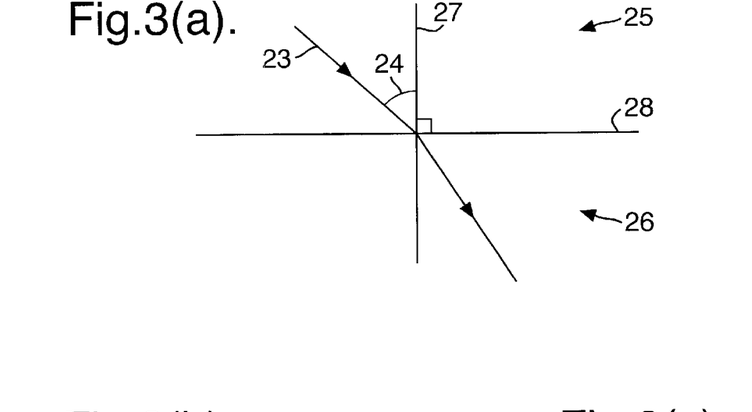
FIG. 3 shows the derivation of the angle at which the parallel surfaces are arranged in order to minimise reflection losses.
Figure 3B:
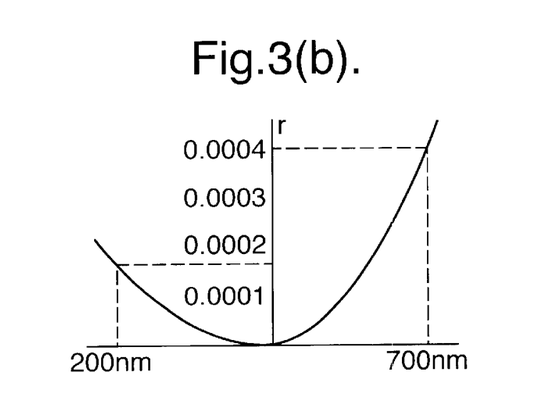
Figure 3C:
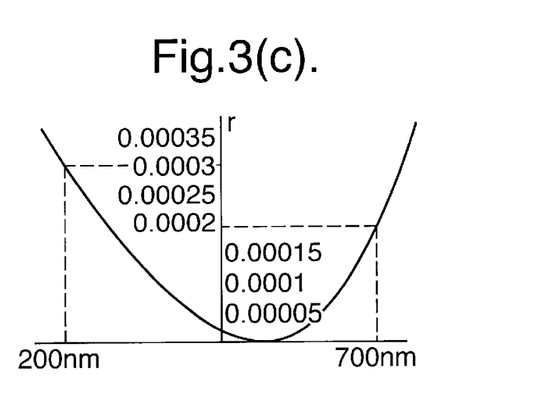
Figure 3D:
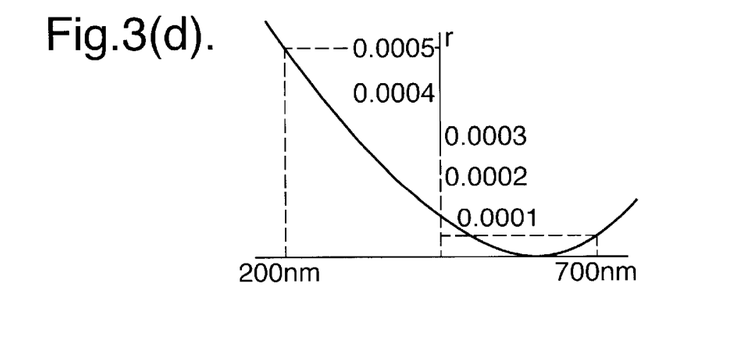

FIG. 2 shows how the use of two interfaces can be employed to mutually cancel the lateral shift inherent for a broadband beam and produce a collinear system. Three prism sections 18, 19, 20 and two interfaces 12, 13; comprising parallel surfaces 14, 15 and gap 21 and parallel surfaces 16, 17 and gap 22 respectively are shown in FIG. 2. A polarised broadband input beam 3, coincident with optical path 11 emerges from surface 14 of prism section 18 and crosses interface 12 where it is incident on surface 15 of prism section 19. Parallel surfaces 14 and 15 are set so that the Brewster condition is satisfied thus minimising reflection losses. However, as described in FIG. 1 above, a lateral shift, Δ, is introduced. This is shown as beam 4. Beams 3 and 4 emerge from surface 16 of prism section 19, cross interface 13 and are incident on surface 17 of prism section 20. Parallel surfaces 16 and 17 are also set so that the Brewster condition is satisfied. Interface 13 produces a lateral shift which is equal in magnitude but opposite in effect to that caused by interface 12. Beams 3 and 4 therefore recombine at face 17 and continue along optical path 11.

FIG. 3 shows the derivation of the required angle (angle 5 in FIGS. 1 and 2) between the propagation direction of the light beam in the light transmitting material and a normal to the parallel surfaces in order to ensure that the Brewster condition is satisfied and reflection losses are minimised. In FIGS. 3b–3d the reflection coefficient is plotted against wavelength for a light beam crossing an air/fused silica boundary. This boundary is shown in FIG. 3a, a light beam 23 is incident on a surface 28 between air 25 and fused silica 26 and makes an angle 24 with a normal 27 to the surface. In FIGS. 3b and 3d angle 24 is set at 33.76° and 33.26° respectively. As is shown, the maximum reflection coefficient is approximately 0.05% over a wavelength range from 200–100 nm. The ideal arrangement is shown in FIG. 3c; angle 24 is set at 33.51° which gives a maximum reflection coefficient of approximately 0.03% over the wavelength range from 200–700 nm.

Figure 4:
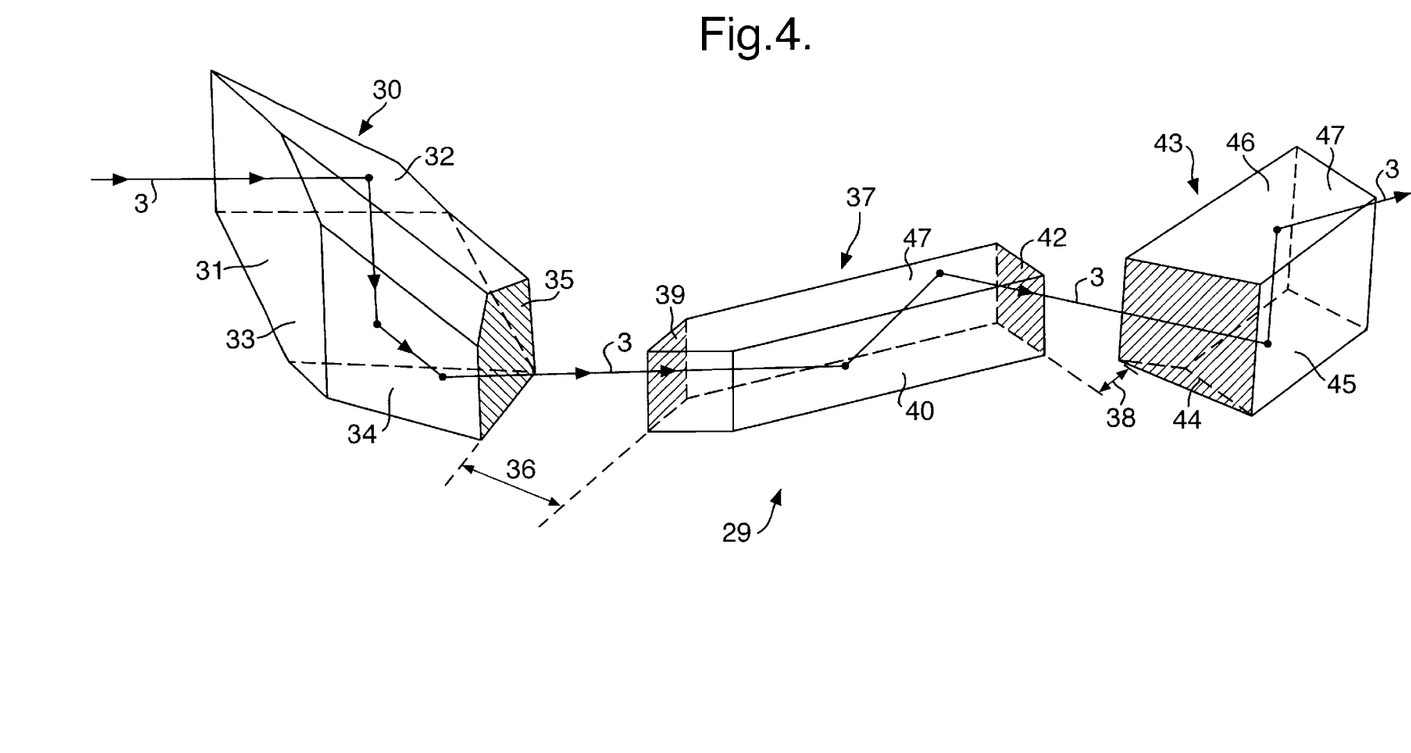
FIG. 4 shows an example of an optical device according to the present invention.

An example of an optical device 29 according to the present invention is shown in FIG. 4. Three prism sections, 30, 37, 43 are shown. A beam of polarised light 3 is incident on face 31 of prism section 30. The beam undergoes three reflections from the totally internally reflecting surfaces 32, 33, 34 and exits from surface 35 of prism section 30. The beam 3 is then incident on surface 39 of prism section 37. Parallel surfaces 35 and 39 are separated by gap 36 and set at an angle such that the Brewster condition is substantially satisfied and thus, as described above, there is minimal reflection loss. Once within prism section 37 the beam undergoes two reflections from totally internally reflecting surfaces 40, 41 and exits from surface 42. The beam is then incident on surface 44 of prism section 43. Parallel surfaces 42 and 44 are separated by gap 38 and also set at an angle such that the Brewster condition is satisfied thereby minimising reflection losses. The beam then undergoes two further reflections from totally internally reflecting surfaces 45 and 46 before exiting normal to face 47.

Prism 30 serves to rotate the polarisation of the light incident at surface 31.

The light exiting surface 35 is rotated through 90° relative to the light at surface 31. The polarisation of the light incident at surface 31 is such that the light is p-polarised at surface 35. The light exiting surface 35 is translated relative to the incident light 3.

Prisms 37 and 43 do not rotate the optical polarisation. Their purpose is to translate the optical beam such that the light exiting surface 47 is collinear with the light which entered surface 31.

There will be a lateral shift dependent on wavelength as described in FIGS. 1 and 2 as the beam transits between prism sections however this has been omitted from FIG. 4 for clarity. The interfaces between parallel surfaces 35 and 39 and parallel surfaces 42 and 44 have equal and opposite effects as described in FIG. 2, therefore the output light beam from the device of FIG. 4 will be collinear with the input light beam.

Figure 5:
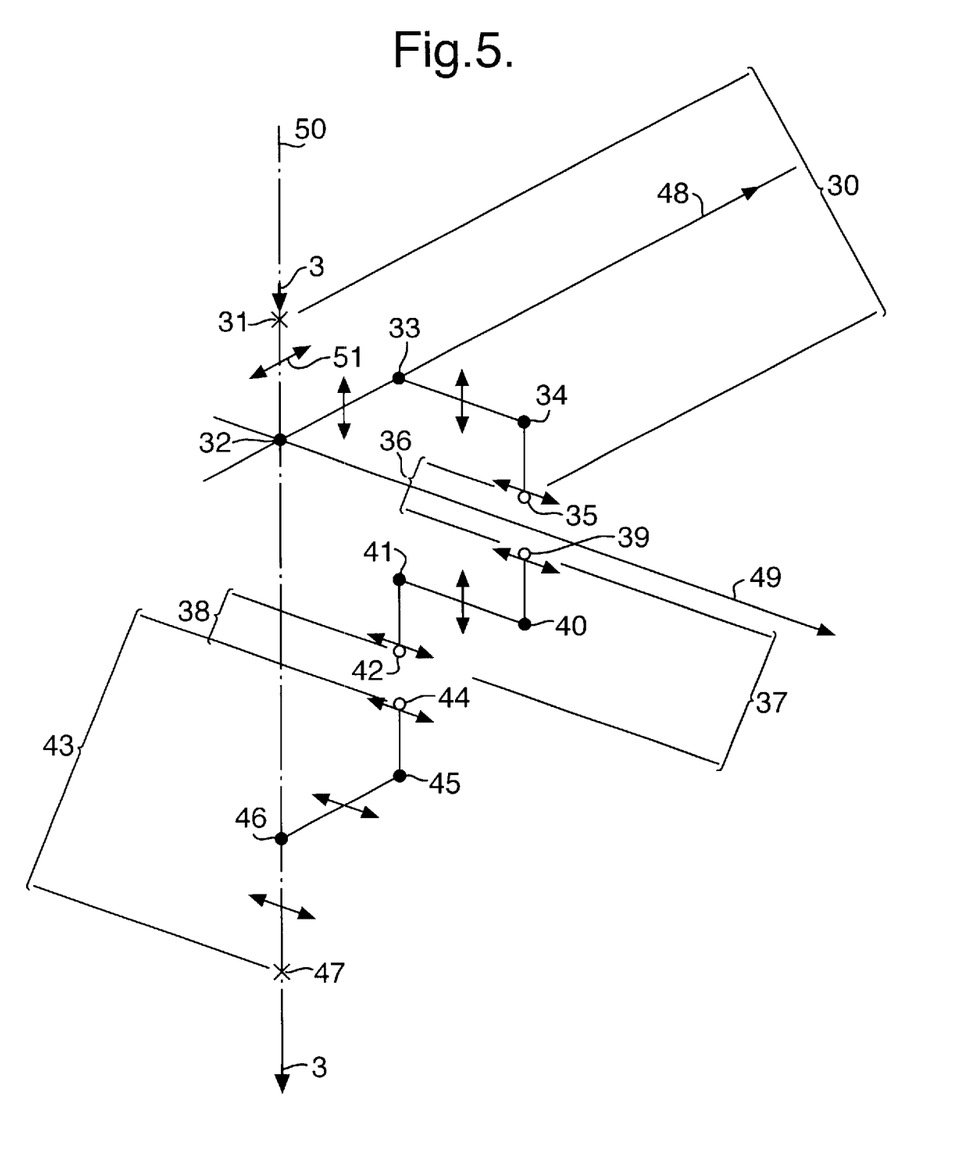
FIG. 5 shows an optical axis propagation plot for the optical device of FIG. 4.

FIG. 5 illustrates how the polarisation of the exit beam is rotated by 90° relative to the input beam for the optical device of FIG. 4. For clarity the reference numbers for the faces of the prism sections 30, 37 and 43 are preserved however the input and exit faces 31, 47 are represented by crosses, the totally internally reflecting surfaces 32–34, 40, 41, 45 and 46 by solid circles and parallel surfaces 35, 39, 42 and 44 by hollow circles. The direction of polarisation of the light beam 3 is represented by the double ended arrows 51 with reference to orthogonal axes 48, 49 and 50. A light beam 3 incident on face 31 is polarised parallel to axis 48 and exits face 47 polarised parallel to axis 49. The polarisation has thus been rotated by 90°. The polarisation of light at each of the reflection surfaces is exclusively p- or s-polarised. This ensures that the light retains linear polarisation. The reflection surfaces are orientated so that the light always propagates parallel to one of the orthogonal axes 48, 49, 50, whilst within each of the prisms 30, 37 and 43.

Polarisation rotation is achieved in the prism 30 by the light undergoing three 90° reflection operations, each of which is in an orthogonal plane. Prisms 37 and 43 serve to translate the beam so as to bring it back to be collinear with the light incident at prism 30. There are two 90° reflections in each prism. The two reflections in prism 37 are within the same plane, as are the two reflections in prism 43.

Figure 6:
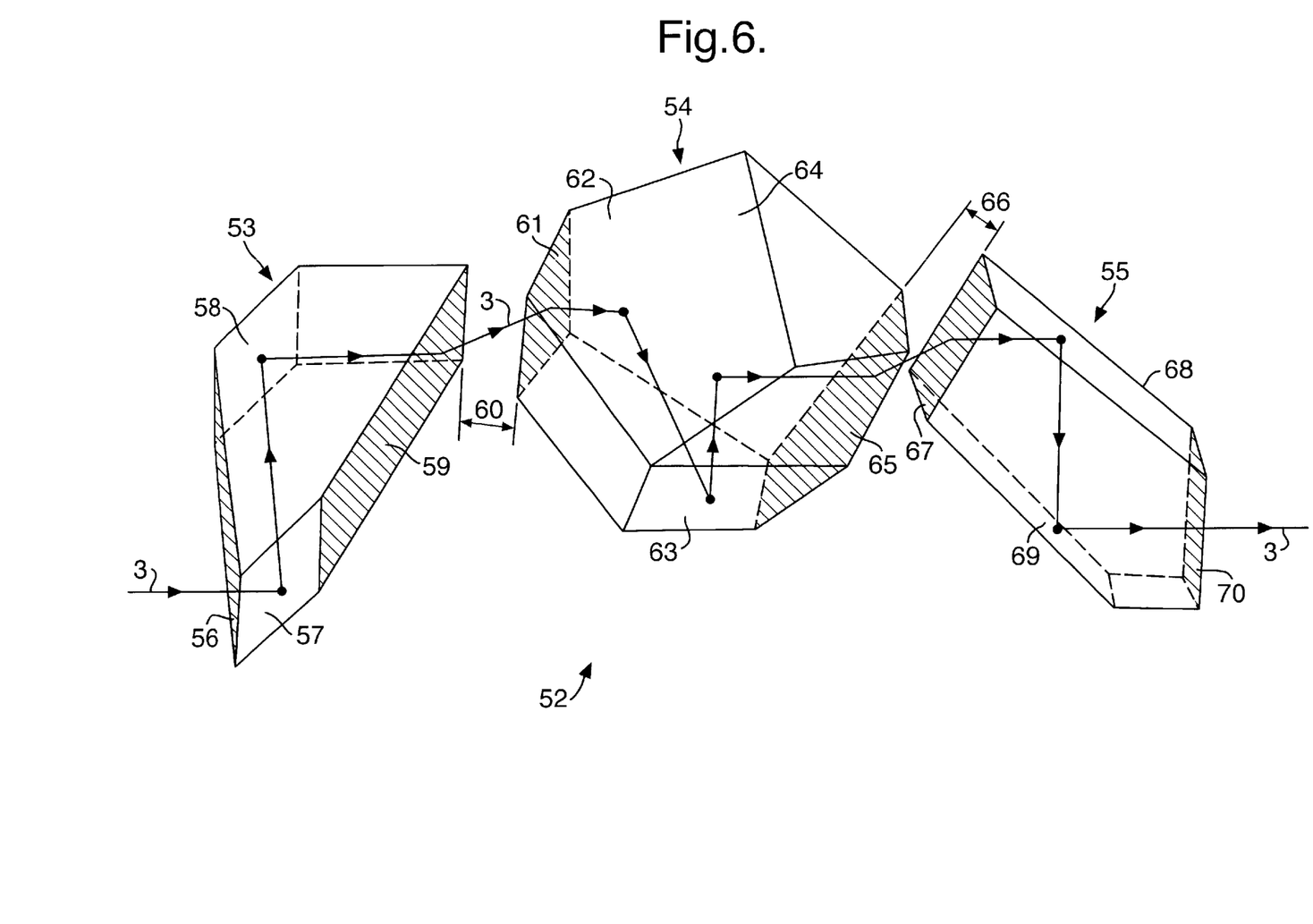
FIG. 6 shows a second example of an optical device according to the present invention; and, FIG. 7 shows an optical axis propagation plot for the optical device of FIG. 6.

A second example of an optical device 52 according to the present invention is shown in FIG. 6. Three prism sections 53, 54 and 55 are shown. A beam of polarised light 3 is incident on face 56 of prism section 53. The beam undergoes two total internal reflections from the parallel surfaces 57, 58 and exits from surface 59 of prism section 53. The beam 3 is then incident on surface 61 of prism section 54. Parallel surfaces 59 and 61 are separated by gap 60 and set at an angle such that the Brewster condition is substantially satisfied and thus, as described above, there is minimal reflection loss. Once within prism section 54 the beam 3 undergoes three reflections from totally internally reflecting surfaces 62, 63 and 64 and exits from surface 65. The beam is then incident on surface 67 of prism section 55. Parallel surfaces 65 and 67 are separated by gap 66 and also set at an angle such that the Brewster condition is satisfied, thereby minimising reflection losses. The beam then undergoes two further reflections from totally internally reflecting surfaces 68 and 69 before exiting normal to face 70.

Prism 54 serves to rotate the polarisation of the light incident at surface 61. The light exiting surface 65 is rotated through 90° relative to the light at surface 61. The polarisation of the light incident at surface 56 is such that the light is p-polarised at surfaces 59, 61, 65 and 67.

Prisms 53 and 55 do not rotate the optical polarisation. Their purpose is to translate the optical beam 3 such that the light exiting through surface 70 is collinear with the light which entered through surface 56. Prisms 53 and 55 individually translate the light in mutually perpendicular directions.

Figure 7:
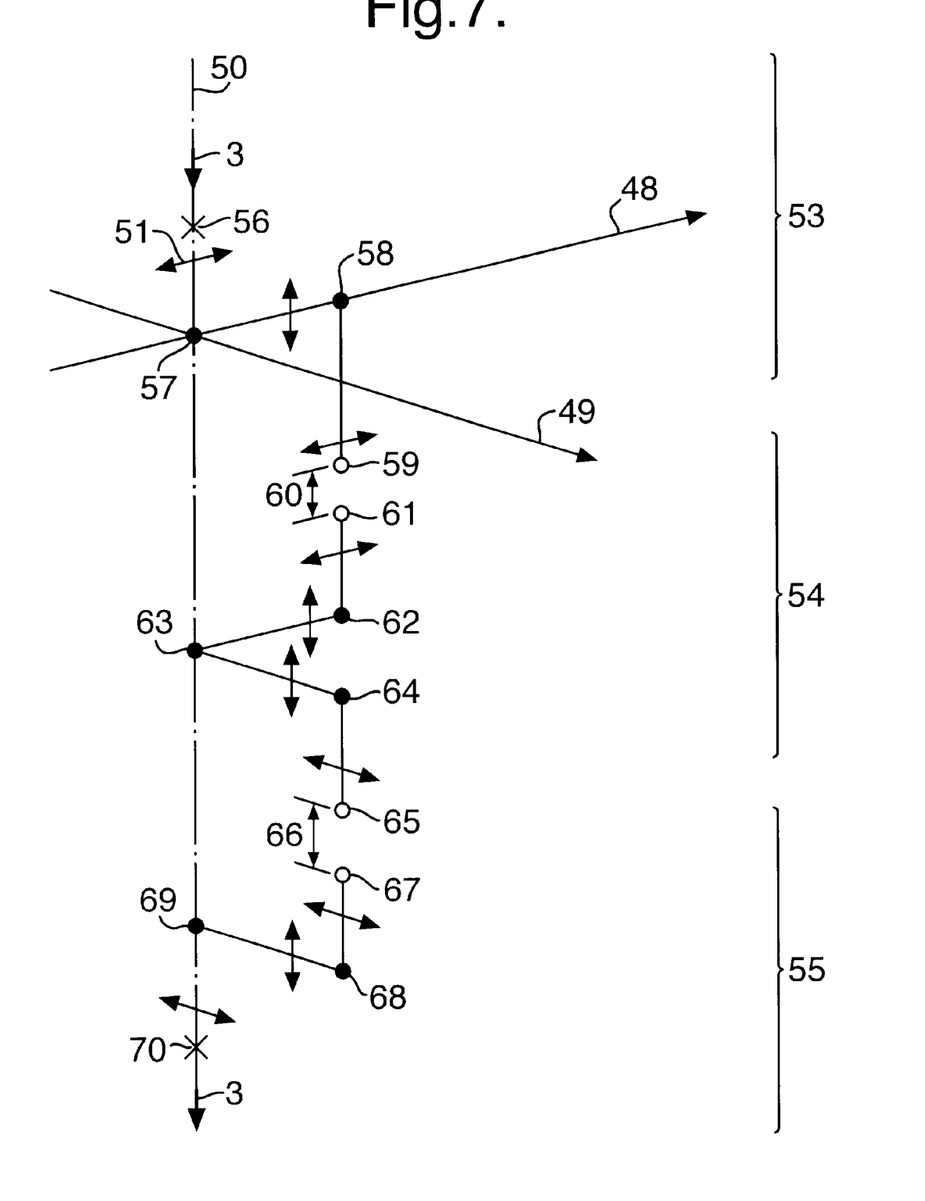

FIG. 7 illustrates how the polarisation of the exit beam is rotated by 90° relative to the input beam for the optical device of FIG. 6. For clarity the reference numbers for the faces of the prism section 53, 54 and 55 are preserved, however the input and exit faces 56, 70 are represented by crosses, the totally internally reflecting surfaces 57, 58, 62, 63, 64, 66 and 69 by solid circles and parallel surfaces 59, 61, 65 and 67 by hollow circles. The direction of polarisation of the light beam 3 is represented by the double ended arrows 51 with reference to orthogonal axes 48, 49 and 50. A light beam 3 incident on face 56 is polarised parallel to axis 48 and exits face 70 polarised parallel to axis 49. The polarisation has thus been rotated by 90°. The polarisation of light at each of the reflection surfaces is exclusively p- or s-polarised. This ensures that the light retains linear polarisation. The reflection surfaces are orientated so that the light always propagates parallel to one of the orthogonal axes 48, 49 and 50, whilst within each of the prism sections 53, 54 and 55.

What is claimed is:

1. An optical device for rotating the polarisation of a linearly polarised, broadband input beam of light, the device comprising prism means; wherein the input beam is incident normal to a first face and exits normal to a second face of the prism means; wherein the prism means comprises a light transmitting material having a plurality of totally internally reflecting surfaces and one or more interfaces; wherein the totally internally reflecting surfaces are arranged such that the polarisation of the exit beam is rotated by 90° relative to the input beam; wherein each interface comprises a pair of parallel surfaces separated by a gap; wherein the parallel surfaces are arranged substantially to satisfy the Brewster condition such that surface reflection losses are minimised; and wherein the input and exit beams are substantially collinear.

2. An optical device according to claim 1, wherein the prism means comprises three prism sections and two interfaces.

3. An optical device according to claim 2, wherein the interfaces are arranged such that lateral shifting of the beam is mutually cancelled.

4. An optical device according to claim 1, wherein the light transmitting material comprises fused silica.

5. An optical device according to claim 4, wherein the gap separating the parallel surfaces is air filled.

6. An optical device according claim 4, wherein the input beam of light has a wavelength in the range of 200–700nm.

7. An optical device according to claim 4, wherein the parallel surfaces are set so that the angle between the direction of propagation of the light beam in the light transmitting material and a normal to the parallel surfaces is in the range 32° to 35°.

8. An optical device according to claim 7, wherein the parallel surfaces are set so that the angle between the direction of propagation of the light beam in the light transmitting material and a normal to the parallel surfaces is in the range 33.26° and 33.76°.

9. An optical device according to claim 7, wherein the parallel surfaces are set so that the angle between the direction of propagation of the light beam in the light transmitting material and a normal to the parallel surfaces is 33.51°.

10. An optical device according to claim 1, wherein the input beam of light is collimated.

11. An optical device according to claim 1, wherein the input beam of light is linearly polarised such that the light refracted at internal surfaces is p-polarised.

* * * * *